United States Patent
Farley et al.

(10) Patent No.: US 11,412,660 B2
(45) Date of Patent: Aug. 16, 2022

(54) SUSPENSION HEADER TRANSPORT

(71) Applicant: CNH Industrial America LLC, New Holland, PA (US)

(72) Inventors: Herbert M. Farley, Elizabethtown, PA (US); Blaine R. Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 227 days.

(21) Appl. No.: 16/689,276

(22) Filed: Nov. 20, 2019

(65) Prior Publication Data

US 2021/0144916 A1    May 20, 2021

(51) Int. Cl.
*A01D 75/00* (2006.01)
*A01B 73/00* (2006.01)

(52) U.S. Cl.
CPC .......... *A01D 75/002* (2013.01); *A01B 73/005* (2013.01); *A01D 75/004* (2013.01)

(58) Field of Classification Search
CPC .... A01D 41/06; A01D 41/142; A01D 75/002; A01D 75/004; A01B 73/005
See application file for complete search history.

(56) References Cited

U.S. PATENT DOCUMENTS

| | | | |
|---|---|---|---|
| 5,243,810 A * | 9/1993 | Fox ...................... | A01B 73/005 56/14.4 |
| 7,086,214 B2 | 8/2006 | Thompson et al. | |
| 7,162,854 B2 | 1/2007 | Yeomans et al. | |
| 7,803,040 B1 | 9/2010 | Flickinger et al. | |
| 7,874,571 B2 * | 1/2011 | Frey ....................... | B60G 3/14 280/442 |
| 7,926,249 B1 | 4/2011 | Cook | |
| 8,210,552 B2 | 7/2012 | Nance | |
| 8,292,328 B2 * | 10/2012 | Honas .................. | A01D 75/002 280/789 |
| 8,657,025 B2 * | 2/2014 | Thompson ........... | A01D 78/146 172/311 |
| 9,386,748 B2 * | 7/2016 | Cook .................... | A01D 75/004 |
| 9,526,204 B2 * | 12/2016 | Rude .................... | A01D 75/002 |
| 10,525,783 B1 * | 1/2020 | Foster .................. | B60G 13/005 |
| 2006/0150605 A1 | 7/2006 | Wubbels et al. | |
| 2019/0200511 A1 * | 7/2019 | Fay, II ................. | A01D 43/06 |
| 2019/0232855 A1 * | 8/2019 | Apple ..................... | B60P 3/066 |
| 2020/0008341 A1 * | 1/2020 | Madarasi ................... | B25J 5/06 |

* cited by examiner

*Primary Examiner* — Adam J Behrens
*Assistant Examiner* — Matthew Ian Neal
(74) *Attorney, Agent, or Firm* — Peter Zacharias; Patrick Sheldrake

(57) ABSTRACT

A transportable agricultural combine header includes a frame and a wheel assembly attached to the frame. The wheel assembly includes: (a) at least one spindle to which a wheel is configured to be mounted; (b) a rotatable arm connected to and extending from the spindle; (c) a frame attachment structure attaching the at least one spindle and the rotatable arm to the frame; and (d) a suspension system interconnecting the rotatable arm and the frame attachment structure for reducing stress on the frame as the agricultural combine header is transported.

16 Claims, 6 Drawing Sheets

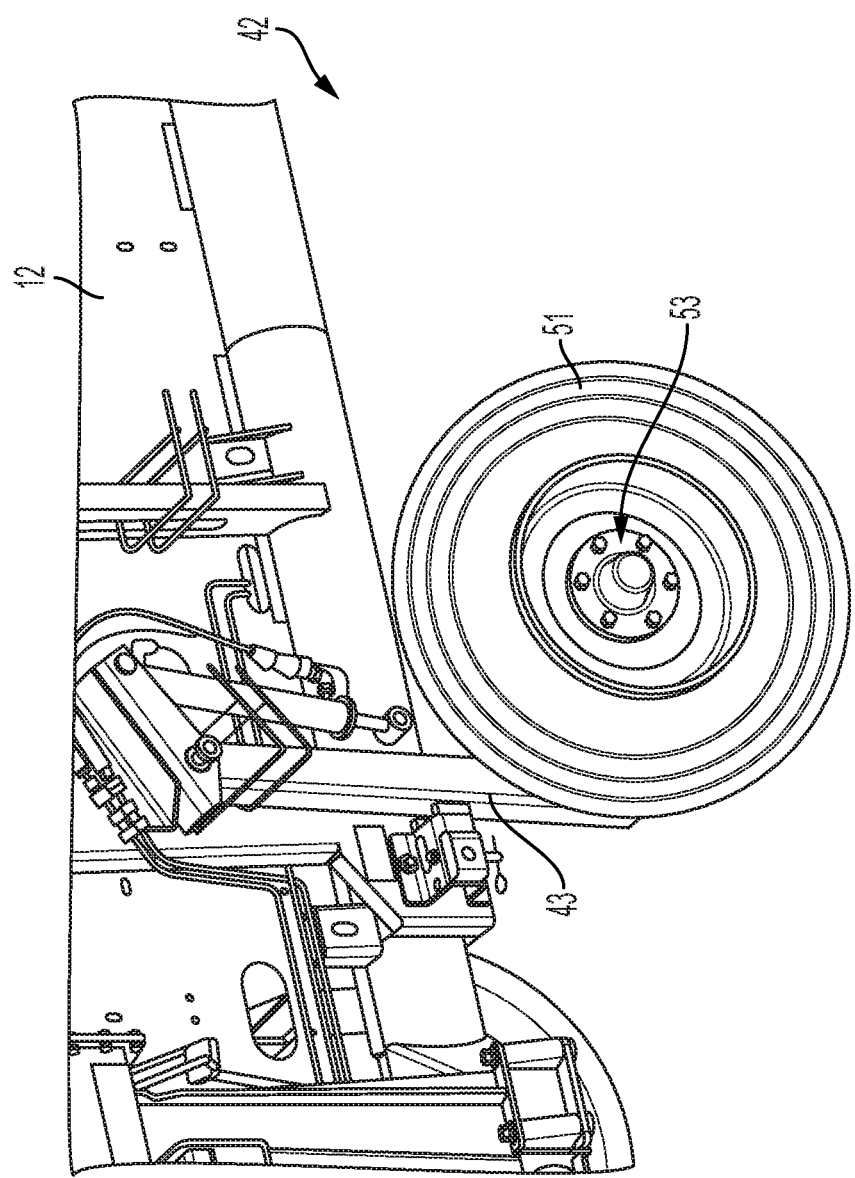

SUSPENSION HEADER TRANSPORT

FIELD OF THE INVENTION

The present invention relates generally to a transport system for crop gathering devices. More particularly, the present invention relates to a suspension system for an integrated transport system for combine headers.

BACKGROUND OF THE INVENTION

To increase harvesting efficiency, agricultural implements and harvesters, such as combines, have increased in size and capacity. With this increase in capacity, the detachable header attached to the combine for picking a crop has increased in size as well. The increased size of the header has resulted in transportation difficulties in moving the header from field to field.

In many instances, larger headers must be transported down roads in a length-wise orientation. Most operators use a separate trailer to transport these headers. The conditions of the roads may not always be ideal for smooth transport of the header. For example, the road surface may be uneven or have pot-holes. Headers do not have a suspension system, thus, as the header is towed down the road, the rough road conditions will generate frame loading, stress and vibrations on the header.

Thus, it would be advantageous to provide a header that includes a suspension system and integral wheels for transportation that dampens the reaction between the header frame and the road, and reduces frame loading as the header is transported.

SUMMARY OF THE INVENTION

According to one aspect of the invention, a transportable agricultural combine header includes a frame and a wheel assembly attached to the frame. The wheel assembly includes: (a) at least one spindle to which a wheel is configured to be mounted; (b) a rotatable arm connected to and extending from the spindle; (c) a frame attachment structure attaching the at least one spindle and the rotatable arm to the frame; and (d) a suspension system interconnecting the rotatable arm and the frame attachment structure for reducing stress on the frame as the agricultural combine header is transported.

According to another aspect of the invention, wheel assembly for a transportable agricultural combine header includes: (a) at least one spindle to which a wheel is configured to be mounted; (b) a rotatable arm connected to and extending from the spindle; (c) a frame attachment structure for attaching the at least one spindle and the rotatable arm to the frame; and (d) a suspension system interconnecting the rotatable arm and the frame attachment structure for reducing stress on the frame as the agricultural combine header is transported.

According to yet another aspect of the invention, the suspension system comprises a torsion axle, shock absorber, spring, coil spring, leaf spring and/or damper that is/are connected between the frame attachment structure and the rotatable arm.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 5A is an enlarged and detailed view of a wheel assembly attached to the frame of the combine header of FIG. 1;

DETAILED DESCRIPTION OF THE INVENTION

Figure 1:
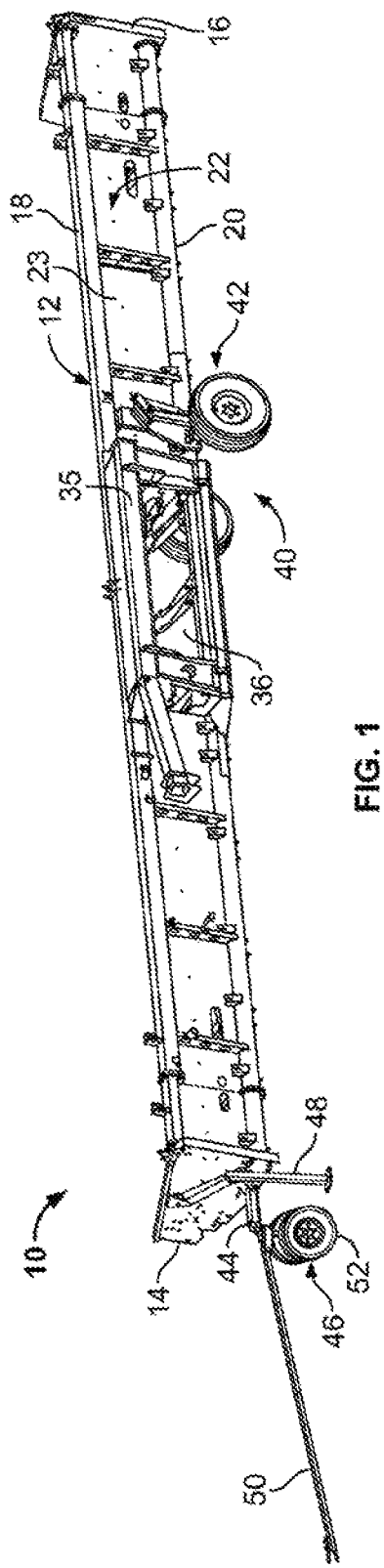
FIG. 1 is a rear perspective view of an embodiment of a transportable combine header.

Corresponding reference characters indicate corresponding parts through the several views. The exemplification set out herein illustrates an embodiment of the invention, in one form, and such exemplification is not to be construed as limiting the scope of the invention in any manner.

The terms "forward", "rearward", "left" and "right", when used in connection with the agricultural combine and/or components thereof are usually determined with reference to the direction of forward operative travel of the combine, but again, they should not be construed as limiting. The terms "longitudinal" and "traverse" are not determined with reference to the fore-and-aft direction of the combine and are equally not to be construed as limiting.

As is described in U.S. Pat. No. 7,926,249, which is incorporated by reference in its entirety, FIG. 1 is a rear perspective view of an embodiment of an agricultural implement, for example, a combine header (header) 10 in a transport configuration. Header 10 may be secured to an agricultural vehicle such as a combine (not shown) as is known in the art and not further discussed. The header 10 may include additional components such as, but not limited to a cutter bar and/or a reel (not shown). The header 10 includes a frame 12 that extends laterally between opposing first end 14 and second end 16. The first end 14 may be referred to as a lead tow end, since the first end 14 is attached closer to a towing vehicle (not shown) during transport. The second end 16 may be referred to as a trailing tow end, since this end is further away from any towing vehicle during transport. The frame 12 includes an upper beam 18 and a lower beam 20. Alternatively, if the frame 12 is segmented, then there can be multiple upper and lower beams.

The header 10 further includes a back sheet or rear wall 22 disposed between the upper beam 18 and lower beam 20 and generally supported by the frame 12. The rear wall 22 extends between the first end 14 and second end 16. The rear wall 22 includes an outside surface 23. The header 10 also includes an attachment frame 35 surrounding an opening 36 and extending rearward from the rear wall 22 for passing cut crop material rearward into a feeder house of a combine (not shown). In another embodiment, the attachment frame 35 does not extend substantially rearward from the rear wall, but is substantially in the plane of the frame 12. The frame 12 further includes bottom support components 24 that extend away from the lower beam 20. In another embodiment, the bottom support components 24 may extend away from the rear wall 12. The header 10 still further includes additional surfaces and supports, such as a cutter bar, which have been omitted for simplicity.

As further shown in FIG. 1, the header 10 includes an integrated suspension transport system 40. The suspension transport system 40 includes a wheel assembly 42 and a trailer attachment or trailer tongue 44. The suspension transport system 40 includes a pivot wheel assembly 46, a stabilizer or jack stand 48, and trailer attachment extension or trailer tongue extension 50. In this exemplary embodiment, the wheel assembly 42 is shown disposed proximate the opening 36. In another embodiment, the wheel assembly 42 is disposed between the opening 36 and the second end 16.

The trailer tongue 44 may be fixed, detachable, or retractable underneath the frame 12 of the header 10. In this exemplary embodiment, the pivot wheel assembly 46 is attached to the trailer tongue 44 and is free to pivot around its vertical axis to assist in steering or turning the header 10 during transport. The trailer tongue extension 50 is coupled to the trailer tongue 44, and may be used to reach a coupling or hitch that is located underneath the combine. In this exemplary embodiment, the pivot wheel assembly 46 includes a pair of wheels 52, however, in another embodiment, the pivot wheel assembly 46 may include one or more wheels 52. Still furthermore, in this exemplary embodiment, the jack stand 48 is attached to first end 14 of the header 10. In another embodiment, the jack stand 48 may be attached to the trailer tongue 44 or to the rear of the header (or to the frame 12).

Figure 2:
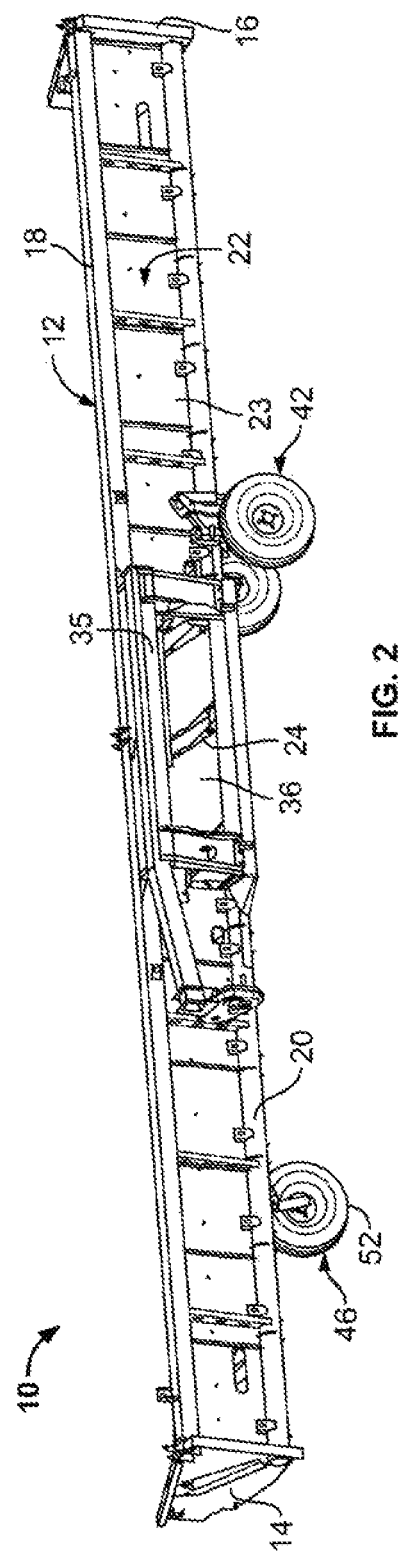
FIG. 2 is a rear perspective view of yet another embodiment of a transportable combine header.

FIG. 2 shows another rear perspective view of an embodiment of the header 10 in a transport configuration. In this embodiment, the pivot wheel assembly 46 is releasably attached to a bottom support component (not shown) between the wheel assembly 42 and the first end 14. In this exemplary embodiment, the pivot wheel assembly 46 includes a wheel 52, however, in another embodiment, the pivot wheel assembly 46 may include one or more wheels 52. A similar bottom support component 24 can be seen through the opening 36. The bottom support component extends toward the front of the header 10 from the lower beam 20 toward the front of the header 10, and is similar to bottom beam 24 which can be seen through opening 36. In another embodiment, the pivot wheel assembly 46 may be releasably attached to the lower beam 20.

Figure 3:
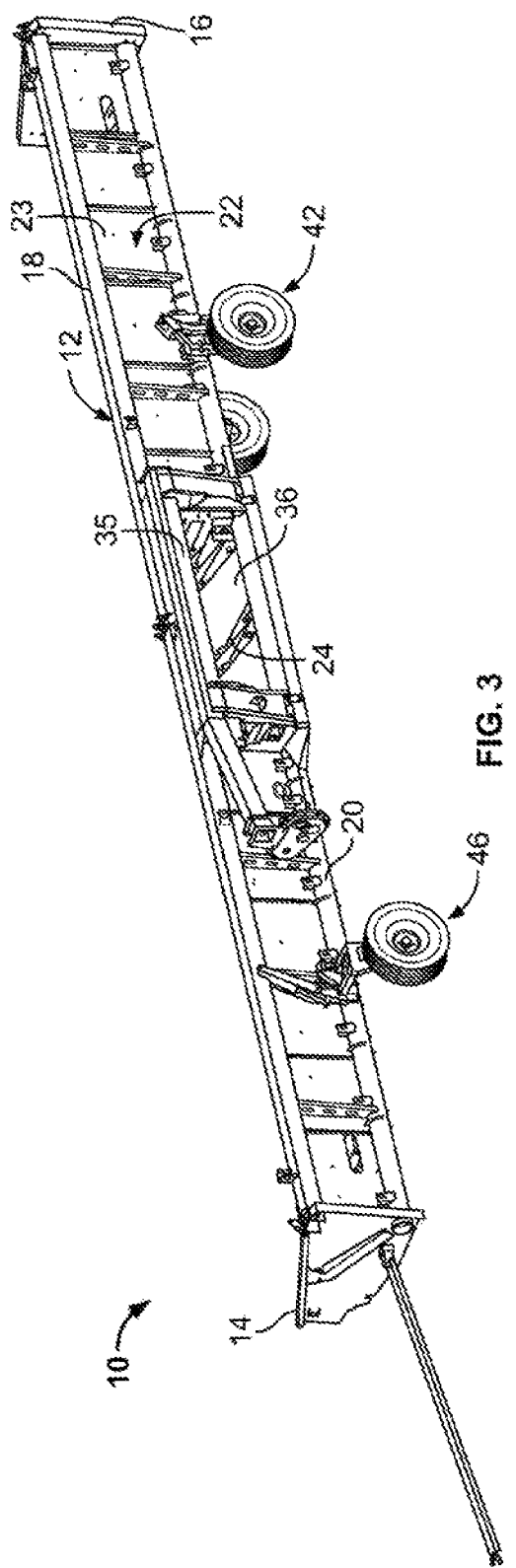
FIG. 3 is a rear perspective view of still another embodiment of a transportable combine header.

FIG. 3 shows another rear perspective view of an embodiment of the header 10 in a transport configuration. In this embodiment, the pivot wheel assembly 46 is attached to the lower beam 20. The pivot wheel assembly 46 is configured to swing up and against the outside surface 23 of rear wall 22 when the header 10 is in a harvest configuration. The mechanism for swinging the pivot wheel assembly 46 into a position proximate the outside surface 23 may be a manual operation in which an operator removes a pin to position the wheel assembly in a storage position, and replaces the pin to secure the position. The mechanism for swinging the pivot wheel assembly 46 and/or wheel assembly 42 into a stored position may also be an automatic or pneumatic operation in which the operator presses a button in a cab of the combine to change a position of the pivot wheel assembly 46 or wheel assembly 42.

Figure 4:
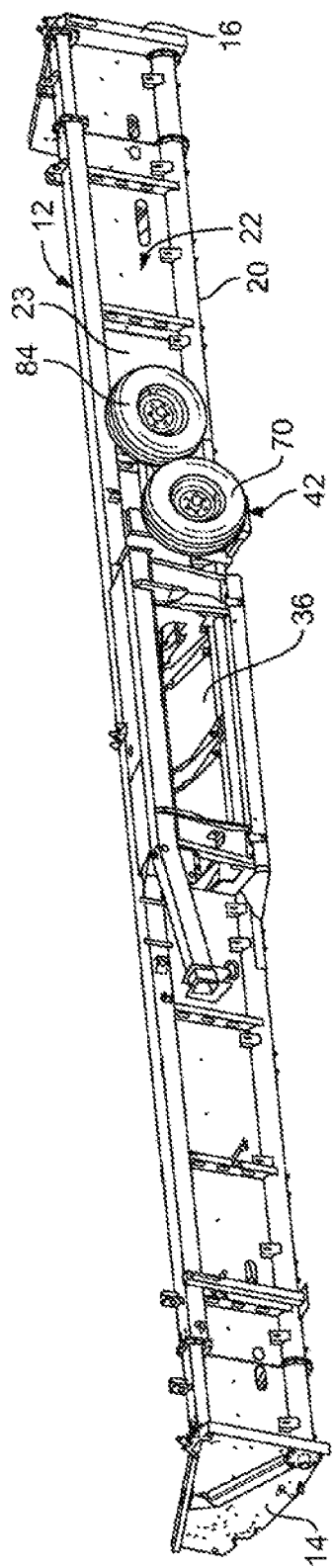
FIG. 4 is a rear perspective view of yet another embodiment of a transportable combine header, wherein the wheel assembly is shown in a stored position.

FIG. 4 is a rear view perspective of the combine header of FIG. 1, wherein the wheel assembly is shown in a fully retracted and stored position, for example, a harvest configuration. As can be seen in FIG. 4, first and second wheels 70, 84 are stored and positioned behind, rearward, adjacent and proximate to the rear wall 22 and above the lower beam 20. In another embodiment, another wheel assembly 42 is present between the opening 36 and the first end 14, and the wheels from the another wheel assembly 42 would also be stored and positioned behind, rearward, adjacent and proximate to the rear wall 22 and above the bottom surface 103 when in a harvest configuration.

Figure 5B:
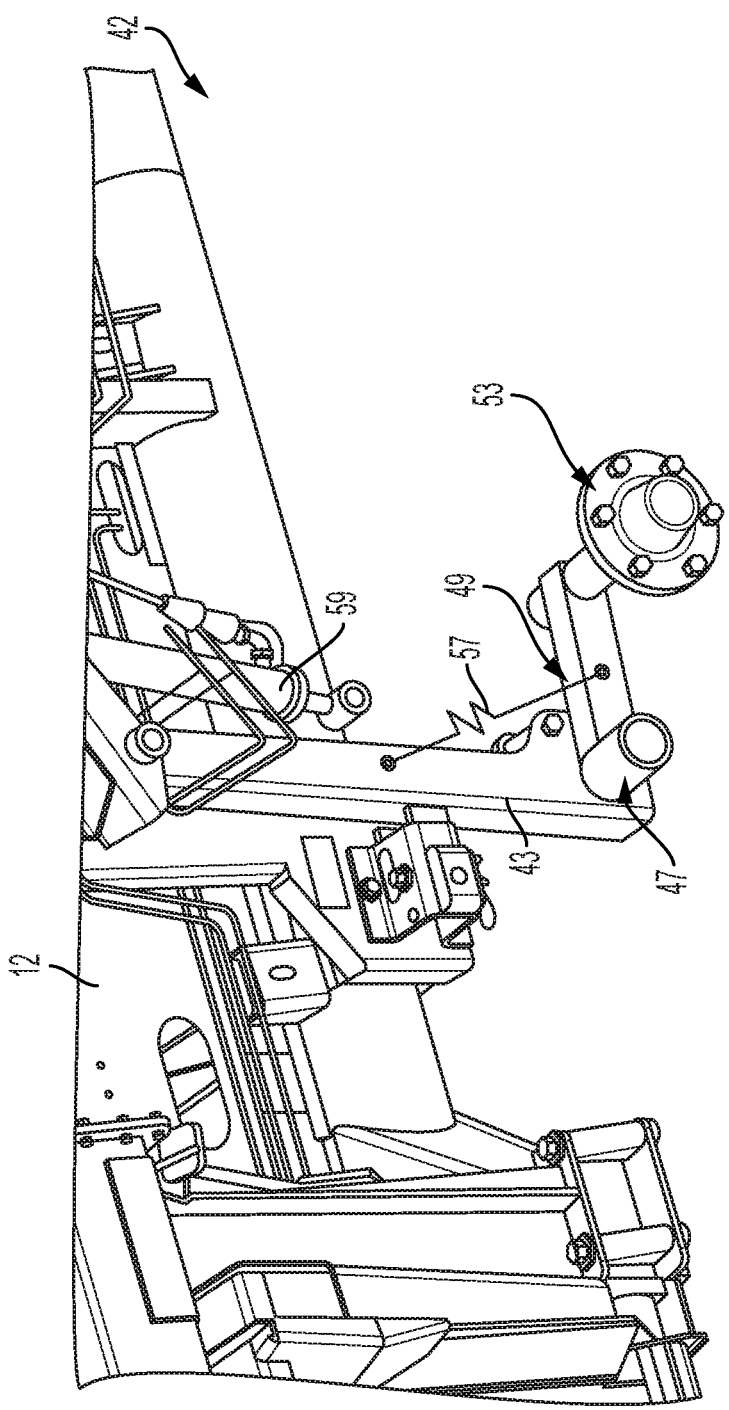
FIG. 5B is another enlarged and detailed view of the wheel assembly with the wheel omitted to reveal other features of the wheel assembly.

Referring now to FIGS. 5A and 5B, those figures depict the wheel assembly 42 of the combine header 10 of any of FIGS. 1-4. It should be understood that the details of the wheel assembly 42 described herein may also apply to the wheel assembly 46.

The wheel assembly 42 comprises a frame attachment structure 43 that is connected to the frame 12. The frame attachment structure 43 is an elongate arm that is configured to be moved between a stowed position and a deployed position (shown). A rotatable arm 49 is connected to the frame attachment structure 43 by a suspension system in the form of a torsion axle 47. The rotatable arm 49, which is also an elongate structure and may be referred to as a torsion arm, is configured to rotate with respect to the frame attachment structure 43 via the torsion axle 47. A spindle 53 extends transversely from the rotatable arm 49, and the wheel 51 is configured to be connected to the spindle 53 in a conventional fashion. In FIG. 5A, the wheel assembly 42 is shown in a transport configuration with the wheel 51 in a deployed or towing position.

The wheel assembly 42 is connected to the frame 12 so as to move between deployed and retracted positions with respect to the frame 12. An actuator 59 is connected between the frame 12 and the wheel assembly 42 for moving the wheel assembly 42 between the deployed and retracted positions. The actuator may be a hydraulic cylinder or electric motor, for example. The wheel assembly 42 can also be manually moved between deployed and retracted positions without an actuator.

The torsion axle 47 is connected directly to the frame attachment structure 43 as well as the rotatable arm 49. The torsion axle 47 is configured to provide dampening to reduce frame loading, stress and vibrations as the header 10 is transported along a rough surface (for example). Conventional transportable headers do not include any type of suspension system, such as the torsion axle 47.

It should be understood that the torsion axle 47 may vary from that which is shown and described. Those skilled in the art will recognize that the torsion axle 47 may be replaced with a suspension system 57 (shown schematically in FIG. 5B, only) in the form of a shock absorber, spring, coil spring, leaf spring and/or damper, for example, that is/are connected between the frame attachment structure 43 and the rotatable arm 49. Alternatively, the header may include both the torsion axle 47 and the suspension system 57.

Figure 6:
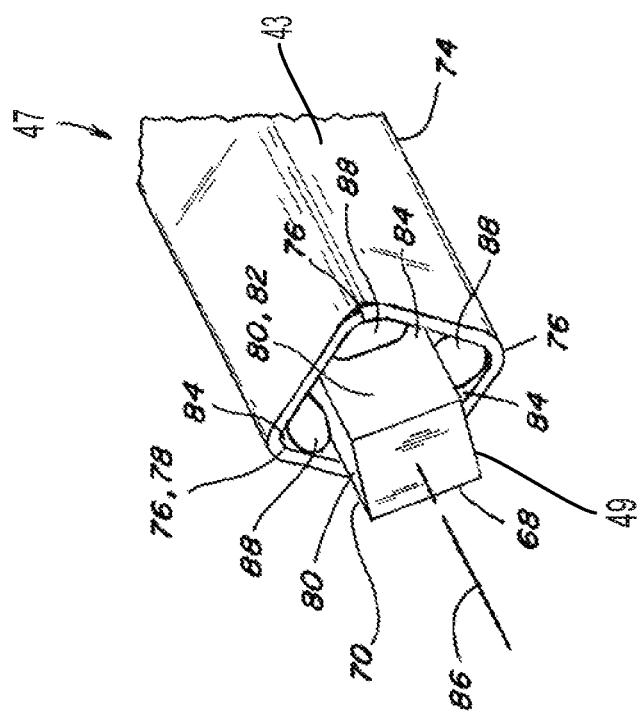
FIG. 6 is a perspective view of an embodiment of a torsion axle of the wheel assembly.

Referring now to the features of the torsion axle 47 shown in FIG. 6, the torsion axle 47 generally includes an inner element 68 and an outer element 74 that is disposed about inner element 68. The inner element 68 is fixedly connected to (or forms part of) the rotatable arm 49, and the outer element 74 is fixedly connected to (or forms part of) the frame attachment structure 43. Alternatively, the inner element 68 is fixedly connected to (or forms part of) the frame attachment structure 43, and the outer element 74 is fixedly connected to (or forms part of) the rotatable arm 49. Damping elements 68 are disposed between the inner element 68 and the outer element 74. In use, as a load is applied to the wheel 51 during transport, the inner element 68 rotates within outer element 74 causing a rolling, compressive resistance in the damping elements 88. The damping elements 88 deform to absorb and dampen loads and prevent or substantially reduce transmission of the jolts, vibrations, etc. of uneven road surfaces outside the outer element 74 to other components of the combine header.

The elongate inner element 68 may be composed of a material such as steel, having an angular sectional shape and opposite longitudinal ends. The elongate tubular outer element 74 may be composed of steel. The outer element 74 has an angular sectional shape having a larger sectional size than a size of the inner element 68. The outer element 74 is oriented in angular offset relation to inner element 68 such that corner portions 76 of an inner surface 78 of outer element 74 are disposed generally oppose flat portions 80 of an outer surface 82 of inner element 68, defining spaces 84 therebetween. The inner element 68 and outer element 74, for example, each have a rectangular shape and more preferably a square shape, such that spaces 84 are generally triangular shaped. Additionally, inner element 68 and outer element 74 are relatively rotatable laterally, that is generally about a longitudinal axis 86 therethrough.

The elongate resilient damping elements 88 are disposed in spaces 84, respectively, such that forces urging the lateral relative rotation of outer element 74 and inner element 68 will act to exert compression forces against damping elements 88, respectively. In an embodiment, the damping elements are elongate cords of a resilient elastomeric material such as, but not limited to, a natural rubber, synthetic rubber, or a mixture of the two, although it should be recognized that other elastomeric polymers or other compositions could be used. The damping elements 88 are configured and disposed about inner element 68 for resiliently opposing relative rotation of elements 68 and 74. Thus, largely resisting significant physical deformation when subjected to loads exerted by the weight of the frame of the combine header during transport. Further details of the torsion axle are disclosed in U.S. Pat. No. 7,803,040, which is incorporated by reference in its entirety.

The torsion axle 47 may vary from that shown in FIG. 6. For example, the elongate resilient damping elements 88 may combined into a single elongate resilient damping element that surrounds the entire outer perimeter of the inner element 68. The single elongate resilient damping element may be bonded to both elements 68 and 74 to enable controlled relative rotation between the elements 68 and 74. The cross-sectional shape of the elements 68 and 74 may also vary, and may be circular, hexagonal or triangular, for example.

The transport system of the present disclosure has been described and shown in the context of a header for a combine. The transport system can, however, be used in other implements that have a great width during field use. Planters and tillage implements are two examples of wide implements for which special provisions are needed for transport of the implement on a road. The transport system of the present disclosure can be integrated into these and other implements, without departing from the scope of the present disclosure.

In light of the foregoing, it should thus be apparent to those skilled in the art that there has been shown and described a combine header, wheel assembly, and suspension system for a deployable wheel of an agricultural implement. However, it should be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed:

1. A transportable agricultural combine header comprising:
    a frame; and
    a wheel assembly attached to the frame, the wheel assembly including:
    (a) at least one spindle to which a wheel is configured to be mounted;
    (b) a rotatable arm connected to and extending from the spindle;
    (c) a frame attachment structure attaching the at least one spindle and the rotatable arm to the frame, wherein the frame attachment structure is moveable with respect to the frame between a retracted position for stowing the wheel in a non-use position and a deployed position for engaging the wheel with the ground, wherein the rotatable arm is connected to the frame attachment structure such that the rotatable arm moves along with the frame attachment structure between the retracted position and the deployed position; and
    (d) a suspension system interconnecting the rotatable arm and the frame attachment structure for reducing stress on the frame as the agricultural combine header is transported, and wherein the rotatable arm is rotatably connected to the frame attachment structure by the suspension system, wherein the suspension system comprises a shock absorber, spring, coil spring, leaf spring and/or damper that is/are connected between the frame attachment structure and the rotatable arm.

2. The transportable agricultural combine header of claim 1, wherein the suspension system is a torsion axle, and the torsion axle includes an elongate inner element, a tubular outer element having a larger sectional shape than the inner element and disposed around the inner element, and one or more of the dampers in the form of elongate dampening elements disposed in the spaces therebetween, wherein the outer element and the inner element are rotatable with respect to one another.

3. The transportable agricultural combine header of claim 2, wherein the inner element is either fixedly connected to or forms part of the rotatable arm, and the outer element is either fixedly connected to or forms part of the frame attachment structure.

4. The transportable agricultural combine header of claim 2, wherein the inner element is either fixedly connected to or forms part of the frame attachment structure, and the outer element is either fixedly connected to or forms part of the rotatable arm.

5. The transportable agricultural combine header of claim 2, wherein each dampening element of the torsion axle is an elastomer.

6. The transportable agricultural combine header of claim 1, wherein movement between the deployed and retracted positions is either manual or automated.

7. The transportable agricultural combine header of claim 6, further comprising an actuator for moving the wheel assembly between the deployed and retracted positions.

8. The transportable agricultural combine header of claim 7, wherein the actuator is a hydraulic cylinder.

9. The transportable agricultural combine header of claim 1, further comprising a cutter bar attached to said frame.

10. An agricultural combine harvester comprising the transportable agricultural combine header of claim 1.

11. A wheel assembly for a transportable combine header, the wheel assembly comprising:
   (a) at least one spindle to which a wheel is configured to be mounted;
   (b) a rotatable arm connected to and extending from the spindle;
   (c) a frame attachment structure for attaching the at least one spindle and the rotatable arm to the frame, wherein the frame attachment structure is moveable with respect to a frame of the transportable combine header between a retracted position for stowing the wheel in a non-use position and a deployed position for engaging the wheel with the ground, wherein the rotatable arm is connected to the frame attachment structure such that the rotatable arm moves along with the frame attachment structure between the retracted position and the deployed position; and
   (d) a suspension system interconnecting the rotatable arm and the frame attachment structure for reducing stress on the frame as the combine header is transported, and wherein the rotatable arm is rotatably connected to the frame attachment structure by the suspension system, wherein the suspension system comprises a shock absorber, spring, coil spring, leaf spring and/or damper that is/are connected between the frame attachment structure and the rotatable arm.

12. The wheel assembly of claim 11, wherein the suspension system is a torsion axle, and the torsion axle includes an elongate inner element, a tubular outer element having a larger sectional shape than the inner element and disposed around the inner element, and one or more of the dampers in the form of elongate dampening elements disposed in the spaces therebetween, wherein the outer element and the inner element are rotatable with respect to one another.

13. The wheel assembly of claim 12, wherein the inner element is either fixedly connected to or forms part of the rotatable arm, and the outer element is either fixedly connected to or forms part of the frame attachment structure.

14. The wheel assembly of claim 12, wherein the inner element is either fixedly connected to or forms part of the frame attachment structure, and the outer element is either fixedly connected to or forms part of the rotatable arm.

15. The wheel assembly of claim 12, wherein each dampening element of the torsion axle is an elastomer.

16. The transportable agricultural combine header of claim 1, wherein each of the spindle, rotatable arm and the frame attachment structure are oriented perpendicular with respect to each other in both the retracted and deployed positions.

* * * * *